United States Patent
Koike et al.

(10) Patent No.: US 10,543,811 B2
(45) Date of Patent: Jan. 28, 2020

(54) WIPER SYSTEM AND WIPER SYSTEM CONTROL METHOD

(71) Applicant: MITSUBA Corporation, Gunma (JP)

(72) Inventors: Tetsuya Koike, Gunma (JP); Ken Hirata, Gunma (JP); Kengo Shimizu, Gunma (JP)

(73) Assignee: MITSUBA CORPORATION, Gunma (JP)

( * ) Notice: Subject to any disclaimer, the term of this patent is extended or adjusted under 35 U.S.C. 154(b) by 176 days.

(21) Appl. No.: 15/521,054

(22) PCT Filed: Nov. 5, 2015

(86) PCT No.: PCT/JP2015/081172
§ 371 (c)(1),
(2) Date: Apr. 21, 2017

(87) PCT Pub. No.: WO2016/076195
PCT Pub. Date: May 19, 2016

(65) Prior Publication Data
US 2017/0313284 A1 Nov. 2, 2017

(30) Foreign Application Priority Data
Nov. 10, 2014 (JP) .................. 2014-227692

(51) Int. Cl.
*B60S 1/08* (2006.01)
*B60S 1/04* (2006.01)

(52) U.S. Cl.
CPC ........... *B60S 1/0807* (2013.01); *B60S 1/0461* (2013.01)

(58) Field of Classification Search
CPC .... B60S 1/0807; B60S 1/0469; B60S 1/0461; B60S 1/0452; B60S 1/08
See application file for complete search history.

(56) References Cited

U.S. PATENT DOCUMENTS 4,723,101 A * 2/1988 Bauer ................... B60S 1/0814
15/250.13
4,934,014 A * 6/1990 Yamamoto .............. B60S 1/185
15/250.12
(Continued)

FOREIGN PATENT DOCUMENTS

JP 2004-274804 9/2004
JP 2006-321285 11/2006
(Continued)

OTHER PUBLICATIONS

International Preliminary Report on Patentability dated May 16, 2017 in International (PCT) Application No. PCT/JP2015/081172.
(Continued)

*Primary Examiner* — Alan D Hutchinson
(74) *Attorney, Agent, or Firm* — Wenderoth, Lind & Ponack, L.L.P.

(57) ABSTRACT

A wiper system performs operation control on wiper driving electric motors and based on position information about wiper blades and attached to pivot shafts, wherein a learning mode in which a position of the wiper blades is learned to correct blade position information is executed after the wiper blades are attached to the pivot shafts, respectively. In the learning mode, the wiper blades are moved to a prescribed position such as a lower retracted position, and that the wiper blades are located in the prescribed position is detected by such means as a sensor, a video image, and contact with a jig. If the wiper blades are detected to be in the prescribed position, the blade position information is corrected to a value corresponding to the position.

3 Claims, 4 Drawing Sheets

(56) References Cited

U.S. PATENT DOCUMENTS

| | | | | |
|---|---|---|---|---|
| 5,333,351 | A * | 8/1994 | Sato | B60S 1/185 |
| | | | | 15/250.13 |
| 6,140,785 | A * | 10/2000 | Hogler | B60S 1/08 |
| | | | | 318/282 |
| 6,651,291 | B2 * | 11/2003 | Lim | B60S 1/185 |
| | | | | 15/250.13 |
| 6,801,006 | B2 * | 10/2004 | Moosmann | B60S 1/08 |
| | | | | 15/250.01 |
| 8,581,530 | B2 * | 11/2013 | Tisch | B60S 1/08 |
| | | | | 318/282 |
| 9,048,763 | B2 * | 6/2015 | Bonnefous | H02P 7/00 |
| 2006/0261768 | A1 | 11/2006 | Kawada et al. | |
| 2009/0119865 | A1 | 5/2009 | Amagasa et al. | |
| 2009/0132115 | A1 * | 5/2009 | Ikeda | B60S 1/08 |
| | | | | 701/36 |

FOREIGN PATENT DOCUMENTS

| | | |
|---|---|---|
| JP | 2007-62671 | 3/2007 |
| JP | 2008-18900 | 1/2008 |
| JP | 2008-148412 | 6/2008 |
| JP | 2009-119986 | 6/2009 |
| WO | 2007/052503 | 5/2007 |

OTHER PUBLICATIONS

International Search Report dated Dec. 28, 2015 in International (PCT) Application No. PCT/JP2015/081172.
Communication pursuant to Article 94(3) EPC dated Sep. 9, 2019 in corresponding European Patent Application No. 15 858 286.6.

* cited by examiner

WIPER SYSTEM AND WIPER SYSTEM CONTROL METHOD

TECHNICAL FIELD

The present invention relates to a technique for controlling a vehicle wiper system mounted on an automobile and the like, and more particularly to initial setting processing when attaching a wiper apparatus to a vehicle.

BACKGROUND ART

Vehicles such as an automobile are equipped with wiper apparatuses for wiping off rain water adhering to a windshield (front windshield) and splashes from front vehicles for the purpose of ensuring the driver's field of view in cases of rainy weather. A wiper apparatus includes a wiper arm which is controlled to oscillate by a wiper driving device. A wiper blade which comes into contact with a windshield is attached to the end of the wiper arm. A pivot shaft which is driven to rotate by a wiper motor is arranged on the body side of the vehicle. The wiper arm is attached to the pivot shaft, and oscillates at a preset control angle according to rotation of the motor.

In attaching a wiper arm to a pivot shaft, the wiper arm has conventionally been fixed to the pivot shaft with an arm position set so that the wiper arm operates at a predetermined control angle. Since the position of the wiper arm is designed on the basis of theoretical values calculated in advance, the position of the wiper blade varies vehicle by vehicle due to dimensional errors, rigidity, and the like of the wiper arm, the wiper blade, and the body. In particular, when an assembly of a wiper arm and a wiper blade (hereinafter, abbreviated as arm & blade) is mounted on the vehicle body, the wiper arm is attached by using a predetermined jig because the assembly is susceptible to deflection of the arm or the blade. For example, in a conventional wiper attaching operation, the arm is initially stopped at a lower retracted position. The wiper arm is then fastened with a nut and mounted on the pivot shaft by using a dedicated jig so that the end of the wiper blade falls within a prescribed range.

CITATION LIST

Patent Document

Patent Document 1: JP 2008-18900 A

DISCLOSURE OF THE INVENTION

Problems to be Solved by the Invention

However, the wiper arm has been rather difficult to accurately mount within the prescribed range even by using a jig because of the arm shape, sinking of the arm due to axial force (force acting in the axial direction), the shape of the windshield, vehicle rigidity, and variations in parts. Since the wiper arm and the like need to be attached swiftly, there has also been a problem that the difficult work needs to be performed in a short time, with high burden on the worker. In the case of a so-called direct drive wiper in which the wiper arm is directly attached to the output shaft of a motor unit without a link mechanism, the pivot shaft of the driver wiper is unfavorably easily caused to rotate when a nut is clamped because of its mechanical structure. As a result, the work of attaching the arm & blade within a predetermined angle range becomes even more difficult.

There has also been a problem that once an arm is mounted outside a prescribed range, the arm is not able to be reused and needs to be disposed because the fitting to the pivot shaft leaves serrated marks.

Means for Solving the Problems

A wiper system according to the present invention is a wiper system including a wiper blade that is arranged on a wiping surface, a wiper arm to which the wiper blade is attached, a pivot shaft that is installed on a vehicle side and to which the wiper arm is fixed, an electric motor that drives the pivot shaft to rotate, and a control device that performs operation control on the electric motor on the basis of position information about the wiper blade. The control device has a learning mode that is executed after the wiper arm is attached to the pivot shaft and in which a position of the wiper blade is learned to correct the position information. The learning mode includes moving the wiper blade to a predetermined prescribed position, detecting that the wiper blade is located in the prescribed position, and correcting the position information to a value corresponding to the prescribed position.

In the wiper system, the control device may include a learning operation start unit that moves the wiper blade to the prescribed position when in the learning mode, a blade position check unit that detects that the wiper blade is located in the prescribed position when in the learning mode, and a position information learning and correction unit that, if the wiper blade is detected to be located in the prescribed position, corrects the position information to the value corresponding to the prescribed position.

Any one of (a) an A-pillar interference position, (b) an upper reversing position, (c) a blade interference upper limit position, (d) a lower reversing position, (e) an intermittent stop position, (f) a lower retracted position, and (g) a lower vehicle body contact position may be employed as the prescribed position.

That the wiper blade is located in the prescribed position may be detected by using a sensor or a video image. In such a case, a proximity sensor and the like may be arranged on the wiping surface, a vehicle body, a jig, or the wiper blade or the wiper arm itself. That the wiper blade is present in the prescribed position may be detected. The wiping surface may be captured by a camera. A camera may be installed on the wiper blade or the wiper arm, and the obtained image may be subjected to image processing to detect that the wiper blade is present in the prescribed position.

A contact member may be arranged in the prescribed position, the wiper blade may be stopped at the prescribed position by the contact member, and that the wiper blade is located in the prescribed position may be detected from a stop of the wiper blade. In such a case, a jig may be arranged in the prescribed position and part or all of the arm or blade may be contacted with the jig to stop the blade at the prescribed position. The blade may be stopped, for example, by using part of the vehicle body, such as an A-pillar, or an anti-reversing member arranged on the vehicle body side as the contact member.

A wiper system control method according to the present invention is a wiper system control method for controlling a wiper system including a wiper blade that is arranged on a wiping surface, a wiper arm to which the wiper blade is attached, a pivot shaft that is installed on a vehicle side and to which the wiper arm is fixed, and an electric motor that drives the pivot shaft to rotate. Operation control on the electric motor is performed on the basis of position information about the wiper blade. The wiper system control method includes, after the wiper arm is attached to the pivot shaft, executing a learning mode in which a position of the wiper blade is learned to correct the position information. The learning mode includes moving the wiper blade to a predetermined prescribed position, detecting that the wiper blade is located in the prescribed position, and correcting the position information to a value corresponding to the prescribed position.

According to the present invention, the learning mode is executed to move the wiper blade to the prescribed position after the wiper arm is assembled to the pivot shaft. After the wiper blade is recognized to be present in the prescribed position, the position information for control is learned and corrected. The position information can thus be changed on the actually-installed windshield surface, and errors in the position information due to variations in the attached position of the wiper blade can be suppressed to be small. Since the position information is learned after the wiper arm is mounted, the work accuracy needed in attaching the blade is relaxed and the work burden on the worker is reduced.

Advantages of the Invention

According to the wiper system and the wiper system control method of the present invention, the wiper system performs operation control on the electric motor, which drives and rotates the pivot shaft to which the wiper arm is fixed, based on the position information about the wiper blade, wherein the learning mode in which the position of the wiper blade is learned to correct the position information is executed after the wiper arm is attached to the pivot shaft. The position information about the wiper blade can thus be changed on the actually-installed wiping surface. This can reduce errors in the blade position information due to variations in the attached position of the wiper blade, and improve control accuracy and wiping performance.

Since the position information about the wiper blade is learned after the wiper arm is mounted, the work accuracy in attaching the blade is relaxed. This facilitates the setting of the arm & blade, and reduces the work burden on the worker. Since the arm & blade are easily and accurately set, reassembling work for angle correction is not needed. This reduces disposal loss due to attachment failures, and cut manufacturing costs.

BEST MODE FOR CARRYING OUT THE INVENTION

Figure 1:
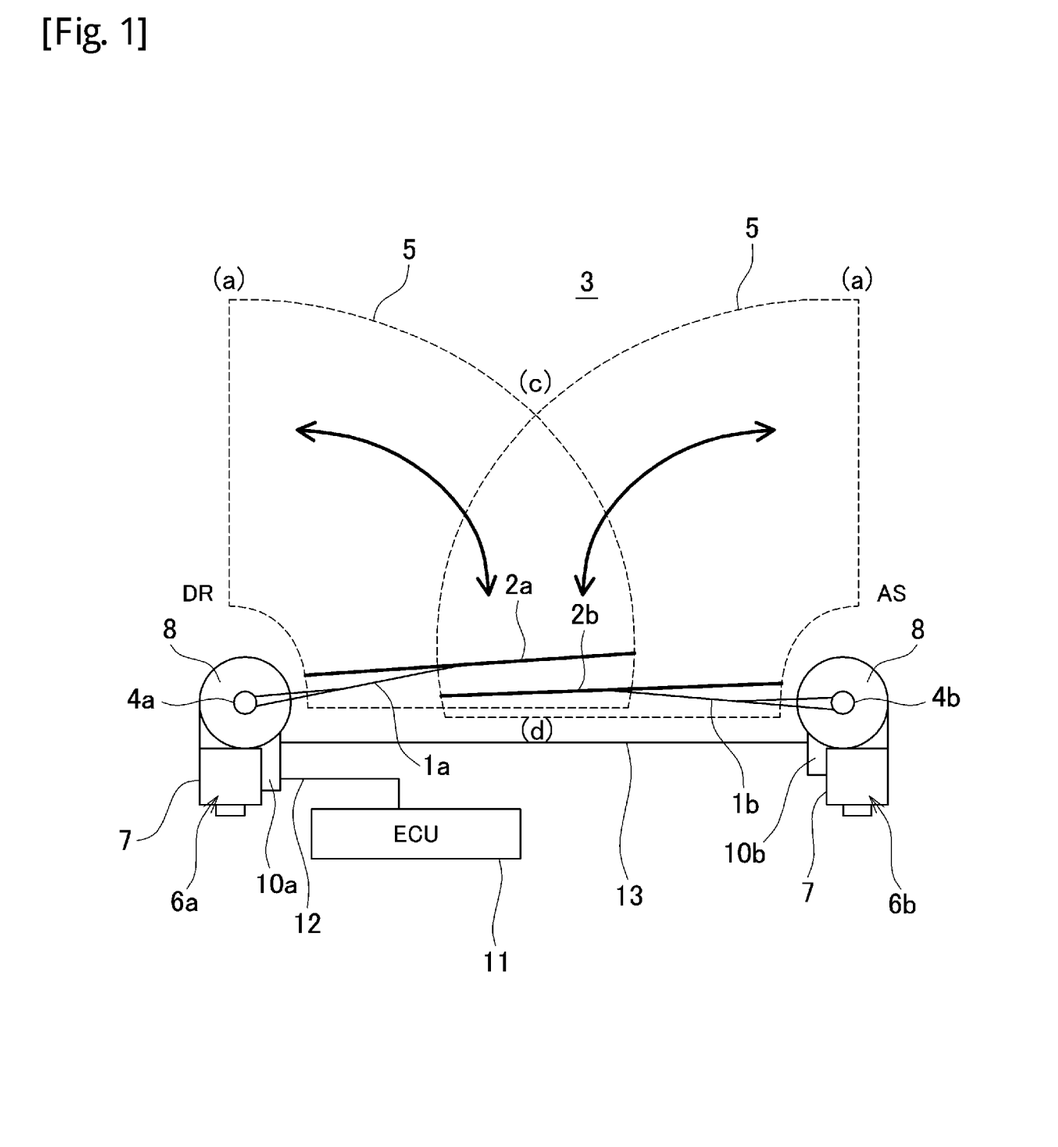
FIG. 1 is an explanatory diagram illustrating an overall configuration of a wiper system which is an embodiment of the present invention.

An embodiment of the present invention will be described in detail below with reference to the accompanying drawings. An object of the following embodiment is to facilitate work for attaching an arm & blade and improve accuracy of the attached position for reduced disposal loss. FIG. 1 is an explanatory diagram illustrating an overall configuration of a wiper system which is an embodiment of the present invention. The wiper system of FIG. 1 has an apparatus configuration of opposite wiping type. A wiper arm 1a on a driver's seat side (DR side) and a wiper arm 1b on an assistant driver's seat side (AS side) (hereinafter, abbreviated as arms 1a and 1b) are arranged to be opposed to each other. Wiper blades 2a and 2b (hereinafter, abbreviated as blades 2a and 2b) are attached to the arms 1a and 1b, respectively. The blades 2a and 2b are elastically contacted with a windshield (wiping surface) 3 by unillustrated spring members and the like arranged inside the arms 1a and 1b.

Two wiper shafts (pivot shafts) 4a and 4b are arranged on a vehicle body. The arms 1a and 1b are attached at their bottom to the wiper shafts 4a and 4b, respectively. In other words, the wiper system of FIG. 1 has a so-called direct drive wiper configuration. Alphabetic symbols "a" and "b" accompanying the reference signs indicate that the members or portions are associated with the driver's seat side and the assistant driver's seat side, respectively. To oscillate the arms 1a and 1b, the system includes two electric motors 6b and 6b (hereinafter, abbreviated as motors 6a and 6b). The motors 6a and 6b each include a motor main body 7 and a reduction mechanism 8.

The motors 6a and 6b are PWM duty-controlled by wiper control devices (control means) 10a and 10b to make forward and reverse rotations. The wiper control device 10a which performs driving control on the motor 6a is connected to an ECU 11, which is a vehicle-side controller, via an on-vehicle LAN 12. The ECU 11 inputs switch information, such as ON/OFF of a wiper switch and Lo, Hi, and INT (intermittent operation), engine start information, and the like into the wiper control device 10a via the LAN 12. The wiper control devices 10a and 10b are connected to each other by a communication line 13.

The wiper system of FIG. 1 performs feedback control (PI control) on the motors 6a and 6b based on position information about the blades 2a and 2b. In the present system, target speeds of the blades 2a and 2b are set corresponding to the positions of both the blades. Target speeds are stored in the wiper control devices 10a and 10b in advance in the form of a map or the like. The wiper control devices 10a and 10b detect the current positions of the blades 2a and 2b, and detects moving speeds of the blades 2a and 2b from rotation speeds of the wiper shafts 4a and 4b. The rotation speeds of the wiper shafts 4a and 4b are detected by using sensor magnets which are attached to the wiper shafts 4a and 4b or the rotation shafts of the motors 6a and 6b and magnetic sensors which are arranged opposite to the sensor magnets (none of which is illustrated). The current speeds of the blades 2a and 2b and the target speeds of the blades 2a and 2b at the current positions are compared, and the motors 6a and 6b are controlled as appropriate according to differences between the target speeds and the current speeds.

The wiper control devices 10a and 10b exchange control information about the motors 6a and 6b via the communication line 13. The wiper control devices 10a and 10b perform synchronization control on the motors 6a and 6b based on a positional relationship between the two blades. The wiper control devices 10a and 10b initially control the motors 6a and 6b to rotate forward or reverse on the basis of the blade positions on their own sides. At the same time, the wiper control devices 10a and 10b control the motors 6a and 6b on the basis of blade position information about both the blades 2a and 2b, whereby the wiper system is controlled so that the blades do not interfere with each other nor increase an angular difference therebetween. As a result, the blades 2a and 2b oscillate between their lower reversing positions and upper reversing positions within a wiping range 5, and rain and snow adhering to the windshield 3 are wiped off.

The wiper system according to the present invention can learn the angles of the blades 2a and 2b (hereinafter, referred to as blade angles) after the arms 1a and 1b are attached to the wiper shafts 4a and 4b. That is, the wiper control devices 10a and 10b can learn the blade angles and correct position information (angle data) for control. Variations in angle in attaching the arms can thus be absorbed and calibrated to improve control accuracy. As a result, work accuracy is relaxed and work burden on the worker is reduced.

To learn the blade angles, predetermined blade positions (for example, upper reversing positions) are initially set as prescribed positions in advance. After the arms are attached, the blades 2a and 2b are moved to the prescribed positions, and that the blades are located there is detected. The blade angles at the prescribed positions are known in advance. If the presence of the blades 2a and 2b in the prescribed positions can be grasped, the accurate blade angles can be detected. Based on the detected data, angular data on other blade positions is then corrected (learned).

Figure 2:
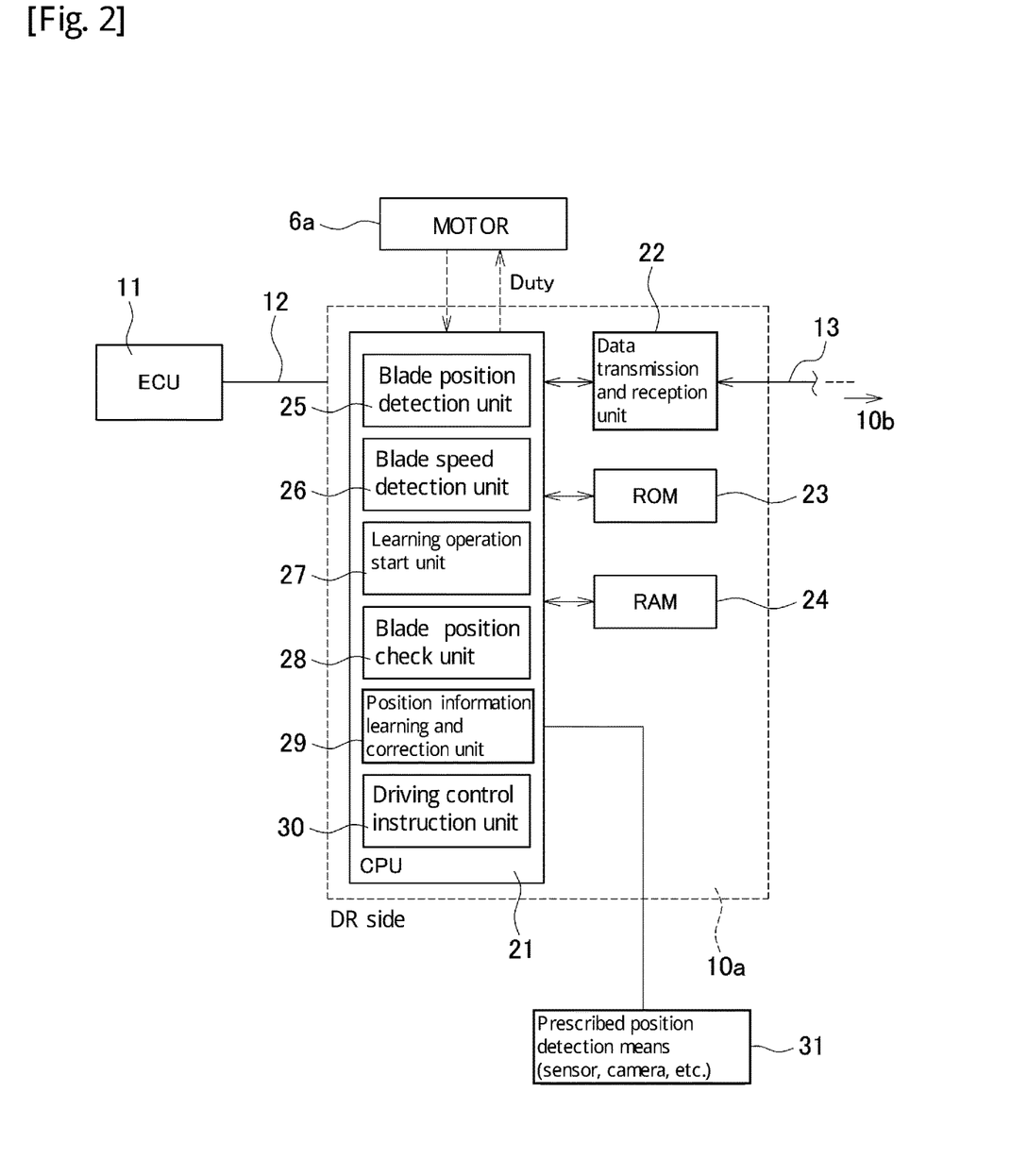
FIG. 2 is a block diagram illustrating a configuration of a control system of a wiper control device.

The wiper control devices 10a and 10b automatically perform such learning processing by executing a "learning mode" of the wiper system. A correction and learning function (program) intended for the "learning mode" is previously set in the wiper control devices 10a and 10b. FIG. 2 is a block diagram illustrating a configuration of a control system of the wiper control device 10a. Since the wiper control devices 10a and 10b have the same configuration, FIG. 2 and the following description deal only with the wiper control device 10a.

The wiper control device 10a includes a CPU 21 and a data transmission and reception unit 22. The wiper control device 10a is connected to the ECU 11 via the LAN 12. The ECU 11 inputs a setting state (operation mode settings such as ON/OFF, Lo, Hi, and INT) of the wiper switch and various types of vehicle information, such as an engine start signal, to the wiper control device 10a. The wiper control device 10a further includes a ROM 23 and a RAM 24. The ROM 23 stores various control programs including the correction and learning function, and various types of control information. The RAM 24 stores control data such as the number of rotations of the motor and the current position of the blade.

The CPU 21 is a central arithmetic processing unit. In the present system, the CPU 21 connected with the ECU 11 serves as a master side, and the CPU of the not-illustrated wiper control device 10b as a slave side. The CPU 21 of the wiper control unit 10a is connected to the CPU of the wiper control device 10b via the data transmission and reception units 22 and the communication line 13. The two CPUs exchange blade position information and operation instructions with each other through the communication line 13. The master-side CPU 21 controls an operation of the motor 6a on the basis of the position information about the blade 2b transmitted from the wiper control apparatus 10b and its own position information (about the blade 2a) according to the state of the wiper switch. The slave-side CPU controls an operation of the motor 6b on the basis of the position information about the blade 2a transmitted from the wiper control device 10a and its own position information (about the blade 2b) according to instructions from the wiper control device 10a.

The CPU 21 includes a blade position detection unit 25 and a blade speed detection unit 26. The blade position detection unit 25 detects the current position of the blade 2a from a sensor signal output from the magnetic sensor arranged on the motor 6a. The blade speed detection unit 26 detects the current speed of the blade 2a from the sensor signal. The CPU 21 also includes a learning operation start unit 27, a blade position check unit 28, and a position information learning and correction unit 29. When the "learning mode" is selected, the learning operation start unit 27 starts the learning mode and automatically moves the blade 2a to a predetermined prescribed position. When the blade 2a is moved to the prescribed position according to the start of the learning mode, the blade position check unit 28 detects that the blade 2a has reached the prescribed position and is located there. That the blade 2a is moved to the prescribed position is detected by using an external prescribed position detecting means 31 or from a change in motor speed, etc. When the blade 2a is confirmed to be in the prescribed position by the blade position check unit 28, the position information learning and correction unit 29 corrects the position information about the blade 2a to correspond to the prescribed position.

The CPU 21 further includes a driving control instruction unit 30. During the learning mode, the driving control instruction unit 30 actuates the blade 2a toward the prescribed position. During a normal operation, the driving control instruction unit 30 operates the blade 2a between the upper and lower reversing positions as appropriate. During the normal operation, the driving control instruction unit 30 instructs the motor 6a about the direction of rotation, duty, and the like on the basis of the blade position information, whereby reciprocations of the blade 2a are controlled.

Figure 3:
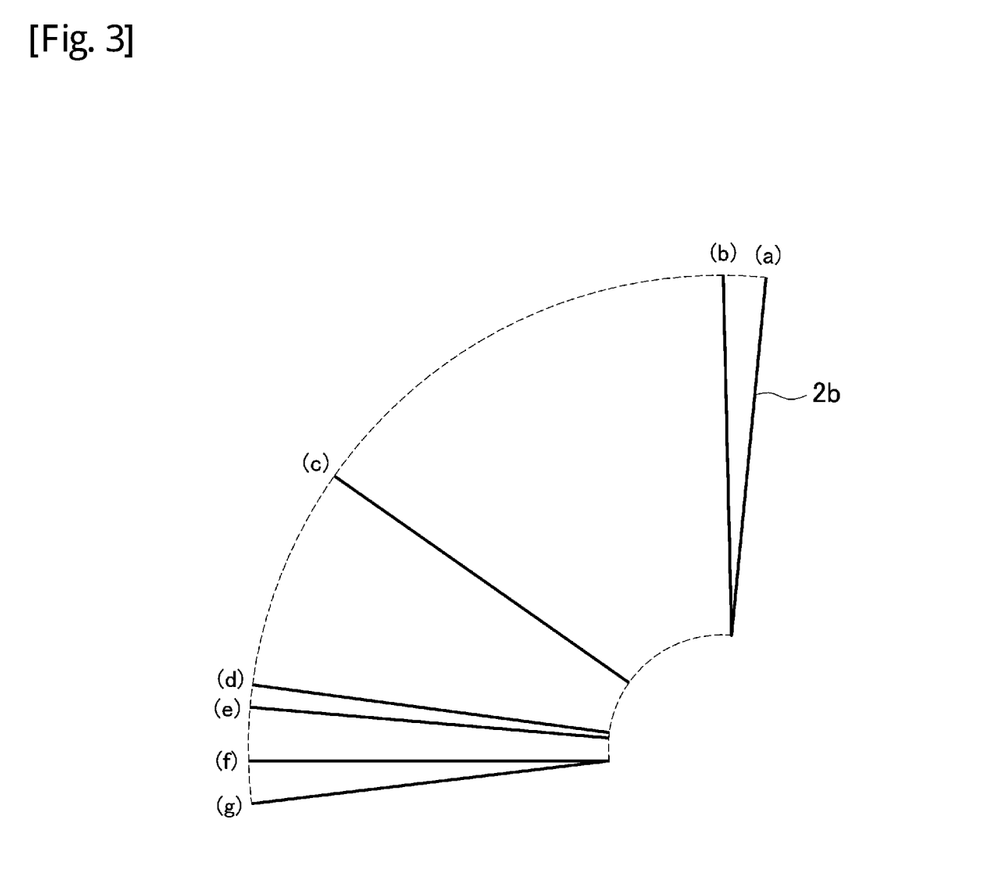
FIG. 3 is an explanatory diagram illustrating examples of a prescribed position of a blade serving as a reference for learning processing.

The wiper system according to the present invention issues a command to perform the "learning mode" to the wiper control devices 10a and 10b after the arms 1a and 1b are attached to the wiper shafts 4a and 4b. By the command, the blades 2a and 2b are automatically activated to perform learning and correction of the blade position information. The wiper control devices 10a and 10b on the DR side and the AS side perform the learning processing while performing synchronization control with each other. As illustrated in FIG. 3, possible prescribed positions of a blade to serve as a reference for the learning processing, including the foregoing upper reversing position, may include: (a) an A-pillar interference position, (b) the upper reversing position, (c) an interference upper limit position between the blades 2a and 2b, (d) the lower reversing position, (e) an intermittent stop position, (f) a lower retracted position, and (g) an extended retracted position (lower vehicle body contact position: a position below the retracted position, where the blade comes into contact with the vehicle body and the blade operation is mechanically blocked). "Prescribed positions" may be set not on the basis of the positions of the blades 2a and 2b but on the basis of those of the arms 1a and 1b. FIG. 3 illustrates various prescribed positions about the blade 2b; similarly, prescribed positions are set also on the blade 2a side.

Examples of a method for detecting that the blades 2a and 2b are located in the foregoing prescribed positions include the following:

Methods using a sensor as the prescribed position detection means 31 may include:

(1) Install the sensor on the windshield 3 and detect the blade position (presence in the prescribed position);
(2) Install the sensor on the body side;
(3) Install the sensor on a jig; and
(4) Install the sensor on the arm or blade.

Various sensors, including optical and magnetic types, may be applied as long as the sensors can detect the proximity of the blade to the prescribed position.

Methods using a video image include the following. Here, a camera is used as the prescribed position detection means 31:

(5) Capture the windshield surface by the camera, and detect the blade position by image processing; and (6) Install the camera on the arm or blade, and detect the blade position from the image.

In (1) to (6), a stopper member for suppressing operation is installed on the body side to prevent the blades 2a and 2b from being actuated beyond an expected range of operation during the learning processing.

Means using a physical contact member include the following. Here, the external prescribed position detection means 31 is not used. Instead, the blades are brought into contact with the contact member so that the blade speed becomes zero, from which the blades 2a and 2b are detected to be located in the prescribed position:

(7) Install a jig in the prescribed position, and bring part or all of the arms or blades into contact with the jig. Stop the blades 2a and 2b in the prescribed position by the jig, whereby the position is defined;

(8) Use the body (for example, an A-pillar: front window pillar) as the contact member. Bring part or all of the arms or blades into contact with the body to stop the blades 2a and 2b at the prescribed position; and (9) Use a body-side anti-reversing member (for example, a stopper arranged in the extended retracted position, on the motor, on a link mechanism, etc.) as the contact member. Bring part or all of the arms or blades into contact with the anti-reversing member to stop the blades 2a and 2b at the prescribed position.

Figure 4:
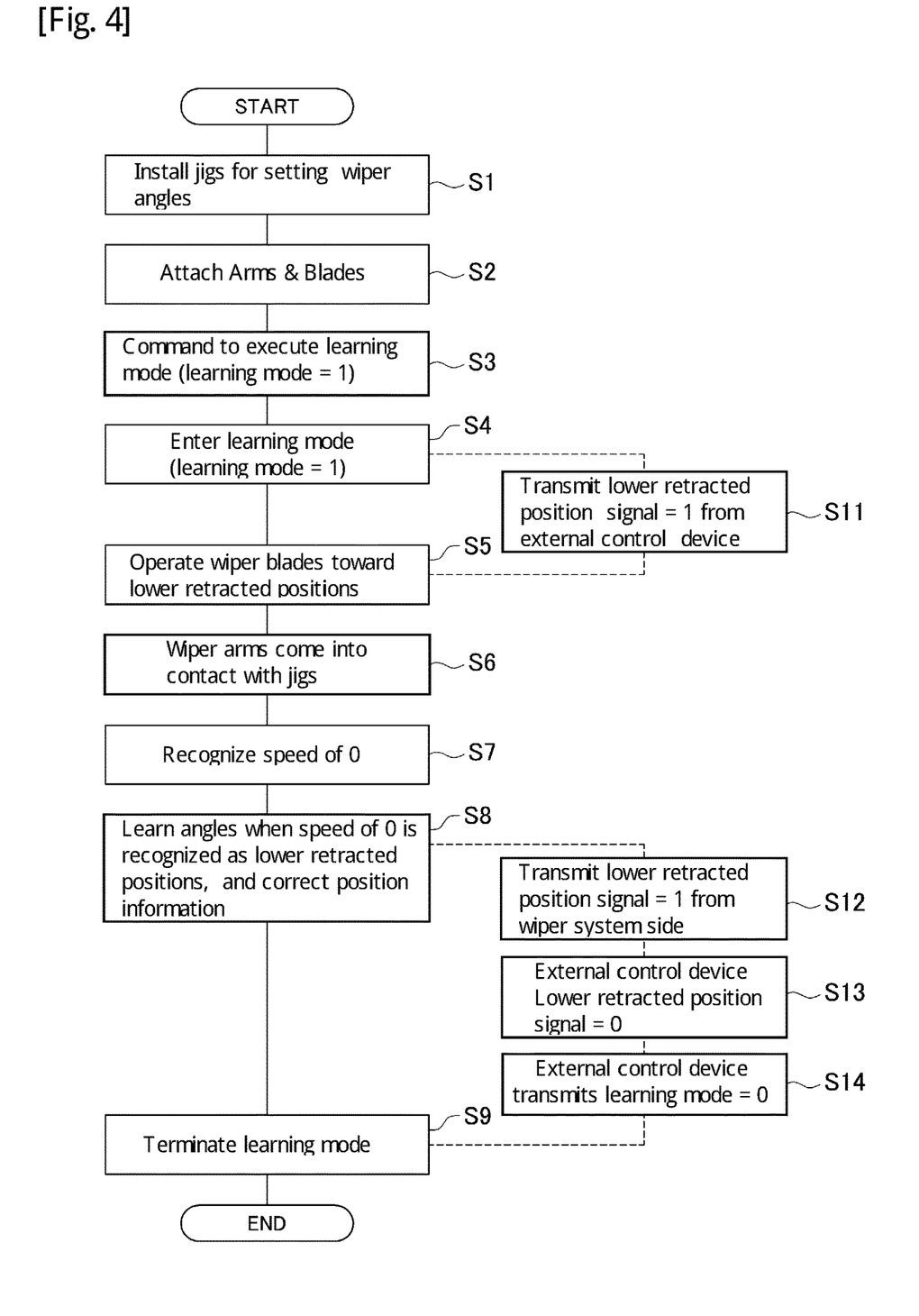
FIG. 4 is a flowchart illustrating an example of a procedure of the learning processing.

As described above, according to this wiper system, a plurality of prescribed positions and a plurality of prescribed position detection means are applicable. The "learning mode" is then executed by a method appropriately combining such positions and means (in the foregoing cases, combinations of (a) to (g) and (1) to (9) provide 7×9=63 possible methods). As an example, a case of combining (f) and (7) in which the learning mode is executed with a jig installed in the lower retracted position will be described. FIG. 4 is a flowchart illustrating a procedure when the arms 1a and 1b are attached to the wiper shafts 4a and 4b and learning processing is performed by the combination of (f) and (7).

As illustrated in FIG. 4, before execution of the learning mode, jigs for setting wiper angles are installed in the lower retracted positions (step S1). The arms 1a and 1b are attached to the wiper shafts 4a and 4b (step S2). Preceeding to step S3, the wiper control devices 10a and 10b are instructed to execute the "learning mode" (step S3). The instruction is given by transmitting a command signal (learning mode=1) for executing the learning mode from an external control device to the wiper control devices 10a and 10b. Receiving the command signal, the wiper control devices 10a and 10b shift their wiper operation to the learning mode (learning mode=1) by using the learning operation start units 27 (step S4).

Entering the learning mode, the wiper control devices 10a and 10b operate the blades 2a and 2b toward the lower retracted positions by using the driving control instruction units 30 (step S5). The blades 2a and 2b thus move toward the lower retracted positions. The blades 2a and 2b moving toward the lower retracted positions eventually come into contact with the jigs installed in the lower retracted positions, and the blades 2a and 2b stop (step S6). If the blades 2a and 2b stop, the blade speed detection units 26 detect a speed of 0 (step S7). The blade position check units 28 detect that the blades 2a and 2b have reached the prescribed positions (lower retracted positions). While the blade stop determination is made on the basis of the blade speed, the blade stop determination may be made on the basis of the duty or operation time of the motors or a combination thereof.

Recognizing the presence of the blades 2a and 2b in the prescribed positions, the blade position check units 28 make the position information learning and correction units 29 to correct the blade position information. More specifically, the angles of the blades 2a and 2b at that point in time are learned as "lower retracted positions," and the angle data on the "lower retracted positions" included in the blade position information is corrected (step S8). As a result, the blade position information is corrected to values corresponding to the prescribed positions (here, lower retracted positions). Aside from the lower retracted positions, the blade position information about various angular positions needed for control, such as the lower reversing positions and the upper reversing positions, is also corrected on the basis of the data on the lower retracted positions. Here, model data of the vehicle on which the wiper system is mounted is also referred to, to accommodate itself to the shape, curvature, and the like of the windshield which vary from one vehicle model to another. After the blade position information is corrected by the position information learning and correction units 29, the wiper control devices 10a and 10b terminate the "learning mode" (learning mode=0: step S9) to exit the routine.

In the procedure of FIG. 4, the movement to the prescribed positions at a start of the learning mode is automatically performed by the learning and correction program stored in the ROM 23. However, a command to move the blades may be given from an external control device (broken-line path: step S11). In such a case, the wiper control devices 10a and 10b receive prescribed positions specified from outside, and move the blades 2a and 2b toward the positions. Such a control configuration can be employed to change the prescribed positions as appropriate according to vehicle model, processes, and the like for enhanced system versatility.

If the prescribed positions are specified from outside, the blade position information is corrected before a signal (lower retracted position information=1) indicating that the blades 2a and 2b have reached the prescribed positions (lower retracted positions) and the blade information position has been corrected is transmitted to the external control device (same: step S12). The lower retracted position signal (prescribed positon instruction signal) in the external control device is thereby cleared (lower retracted position information=0) (same: step S13). The external control device in response transmits a command signal (learning mode=0) to terminate the learning mode to the wiper control devices 10a and 10b (same: step S14). The wiper control devices 10a and 10b terminate the "learning mode" (learning mode=0: step S9).

As described above, in the wiper system according to the present invention, the arms 1a and 1b are assembled within respective certain ranges, and then the "learning mode" is executed to move the blades 2a and 2b to the prescribed positions. After the blades 2a and 2b are recognized to be located in the prescribed positions, the blade position information for control is corrected to data corresponding to the prescribed positions. As a result, the blade position information can be changed on the actually-installed windshield surface, and errors in the blade position information due to variations in the attached positions of the blades 2a and 2b can be reduced to improve control accuracy. This can also improve the setting accuracy of the wiping range, and improve interference prevention accuracy about interference between the blades of the wiper apparatus of opposite wiping type. Consequently, the wiping performance improves, and the system's quality and additional value also improve.

Since the blade angles are learned after the arms are mounted, high accuracy is not needed of the initially attached positions of the blades. This facilitates the attachment of the arms & blades, and reduces work burden on the worker. Since the learning processing is automatically executed according to the mode setting, assembly workability also improves. Since the arms & blades can be easily and accurately attached, reassembling work for angle correction is not needed. This reduces disposal loss due to attachment failures, and cuts manufacturing costs. In addition, since the blade position information can be set after the mounting on the vehicle, the wiper arms and blades can be shared by a plurality of vehicle models.

The present invention is not limited to the foregoing embodiment, and it will be understood that various modifications may be made without departing from the gist thereof.

In the foregoing embodiment, the seven locations (a) to (g) are described as examples of prescribed positions, while other locations may be used as prescribed positions. For example, a hood (engine hood) interference angle (angle at which the hood and a wiper blade interfere with each other when the hood is opened with the wiper blade erected) may be used. A "learning mode check position" may be specially set for the purpose of the learning processing. In other words, prescribe positions can be arbitrarily set as long as the prescribed positions can be recognized as such. While a combination of a sensor magnet and a magnetic sensor such as a Hall IC is described to be used as means for detecting the rotation speed of the wiper shafts 4a and 4b and the motors 6a and 6b, rotary encoders and MR sensors may be used.

INDUSTRIAL APPLICABILITY

In the foregoing embodiment, the present invention is described to be applied to a wiper apparatus of opposite wiping type in which two electric motors are laterally symmetrically arranged with the respect to the windshield, and the wiper arms on the driver's seat side and the assistant driver's seat side are operated to wipe in opposite directions. However, the present invention may be applied to a wiper apparatus of tandem type in which the wiper arms on the driver's seat side and the assistant driver's seat side are operated to wipe in substantially the same direction. While the wipers are described to have a direct drive wiper configuration, the present invention may be applied to wipers using a link mechanism.

REFERENCE SIGNS LIST 1a, 1b: Wiper arm
2a, 2b: Wiper blade
3: Windshield
4a, 4b: Wiper shaft
5: Wiping range
6a, 6b: Motor
7: Motor main body
8: Reduction mechanism
10a, 10b: Wiper control device
11: ECU
12: On-vehicle LAN
13: Communication line
21: CPU
22: Data transmission and reception unit
23: ROM
24: RAM
25: Blade position detection unit
26: Blade speed detection unit
27: Learning operation start unit
28: Blade position check unit
29: Position information learning and correction unit
30: Driving control instruction unit
31: Prescribed position detection means

The invention claimed is:
1. A wiper system comprising:
a wiper blade that is arranged on a wiping surface;
a wiper arm to which the wiper blade is attached;
a pivot shaft that is installed on a vehicle side and to which the wiper arm is fixed;
an electric motor that drives the pivot shaft to rotate; and
a control device that performs operation control on the electric motor based on position information about the wiper blade,
the control device having a learning mode that is executed when the wiper arm is attached to the pivot shaft and in which a position of the wiper blade is learned to correct the position information,
the learning mode including, after the wiper arm is attached to the pivot shaft, moving the wiper blade to a predetermined prescribed position, detecting that the wiper blade is located in the prescribed position, and correcting the position information to a value corresponding to the prescribed position,
wherein that the wiper blade is located in the prescribed position is detected by using a video image.
2. The wiper system according to claim 1, wherein the control device includes:
a learning operation start unit that moves the wiper blade to the prescribed position during the learning mode; and
a blade position check unit that detects that the wiper blade is located in the prescribed position during the learning mode.
3. The wiper system according to claim 1, wherein the prescribed position is any one of (a) an A-pillar interference position, (b) an upper reversing position, (c) a blade interference upper limit position, (d) a lower reversing position, (e) an intermittent stop position, (f) a lower retracted position, and (g) a lower vehicle body contact position.

* * * * *